United States Patent [19]

Mae et al.

[11] Patent Number: 4,546,732
[45] Date of Patent: Oct. 15, 1985

[54] FUEL INJECTION APPARATUS FOR CONTROLLING THE AMOUNT OF ALCOHOL AND GASOLINE SUPPLIED TO A MIXED FUEL ENGINE

[75] Inventors: Hisao Mae; Kazuo Miyauchi, both of Susono, Japan

[73] Assignee: Toyota Jidosha Kabushiki Kaisha, Japan

[21] Appl. No.: 557,929

[22] Filed: Dec. 5, 1983

[30] Foreign Application Priority Data

Mar. 9, 1983 [JP] Japan .................................. 58-37300

[51] Int. Cl.⁴ ...................... F02D 19/08; F02M 51/00
[52] U.S. Cl. .................... 123/1 A; 123/478; 123/575
[58] Field of Search ............... 123/1 A, 478, 575, 576, 123/577, 578

[56] References Cited

U.S. PATENT DOCUMENTS

4,391,244 7/1983 Kobashi et al. ...................... 123/339

FOREIGN PATENT DOCUMENTS

| 3129726 | 2/1982 | Fed. Rep. of Germany | 123/1 A |
| 2478746 | 9/1981 | France | 123/575 |
| 131839 | 8/1982 | Japan | 123/1 A |
| 181949 | 11/1982 | Japan | 123/1 A |
| 181948 | 11/1982 | Japan | 123/1 A |
| 27834 | 2/1983 | Japan | 123/575 |

Primary Examiner—Tony M. Argenbright
Attorney, Agent, or Firm—Parkhurst & Oliff

[57] ABSTRACT

An apparatus for controlling the amount of alcohol and gasoline injected into an engine which uses a mixed fuel, where alcohol is the main fuel and gasoline is the auxiliary fuel. The fuel injection rates vary depending in part upon the temperature of the engine coolant, the position of a transmission's shifting device, engine RPM, engine air intake rate and oxygen sensor readings.

29 Claims, 5 Drawing Figures

FUEL INJECTION APPARATUS FOR CONTROLLING THE AMOUNT OF ALCOHOL AND GASOLINE SUPPLIED TO A MIXED FUEL ENGINE

BACKGROUND OF THE INVENTION

The present invention relates to an apparatus for controlling the amount of alcohol and gasoline supplied to a mixed fuel engine, and more particularly to a fuel injection apparatus for obviating the problem of rough idling and stalling when an engine is in the warming up stages.

Applicant has previously proposed a fuel injection control device for improving the performance of a mixed fuel engine upon starting it (Japanese Patent Application Filing No. Sho 56-88811, Japanese Laid-Open Patent Publication No. Sho 57-206735). This prior device provided for gasoline, utilized as an auxiliary fuel, to be injected from an auxiliary fuel injection valve, installed in line with a surge tank, into an intake passage on the engine, when the temperature of the engine is lower than a predetermined temperature. This results in improved engine starting performance. However, the ratio of injected gasoline to alcohol is not dependent upon whether the engine is idling or not. Consequently, the engine may stall because of the lack of engine power, particularly when starting the engine. The engine may also run very rough when trying to drive the vehicle. Finally, the alcohol fuel is consumed at an unnecessarily high rate resulting in lower miles per gallon.

SUMMARY OF THE INVENTION

The present invention was made in view of the foregoing background and to overcome the foregoing drawbacks. It is accordingly an object of this invention to provide an apparatus to control fuel injection in an engine to improve the starting performance of an engine supplied with a mixture of alcohol and gasoline as the fuel.

To obtain the above objects, an apparatus for controlling the amount of alcohol and gasoline supplied to a combustion chamber of a mixed fuel engine according to the present invention comprises:

a main fuel injection valve for injecting the alcohol fuel into the combustion chamber of the engine;

an auxiliary fuel injection valve for injecting gasoline fuel into the combustion chamber of the engine;

a first detecting means for detecting the temperature of the coolant water in the engine;

a second detecting means for detecting whether the engine is idling;

a memory means for storing a prescribed ratio of alcohol to gasoline to be injected into the engine upon determining by the first detecting means that the engine coolant is below a predetermined temperature;

a basic fuel rate ratio wherein the ratio of alcohol to gasoline is fixed, but can be subsequently adjusted depending upon engine coolant temperature and idling condition;

a compensated fuel rate ratio wherein the ratio of injection rates of alcohol to gasoline decreases whenever the engine is subjected to idling conditions and the engine coolant is below a predetermined temperature;

a central processing unit inputted with data from the various detecting means and the memory means, the unit carrying out arithmetic and logic processing functions, resulting in the issuance of injection signals to the main and auxiliary fuel injection valves for injecting prescribed amounts of fuel; and an actuating means for operating the main and auxiliary fuel injection valves in accordance with the signals from the central processing unit whereby the starting of the engine is improved by increasing the ratio of gasoline to alcohol in the combustion chamber.

BRIEF DESCRIPTION OF THE DRAWINGS

The above objects, features and advantages of the present invention will become more apparent from reading the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate embodiments of the fuel injection apparatus for injecting the mixed alcohol and gasoline fuel into the engine in accordance with the present invention.

Figure 1:
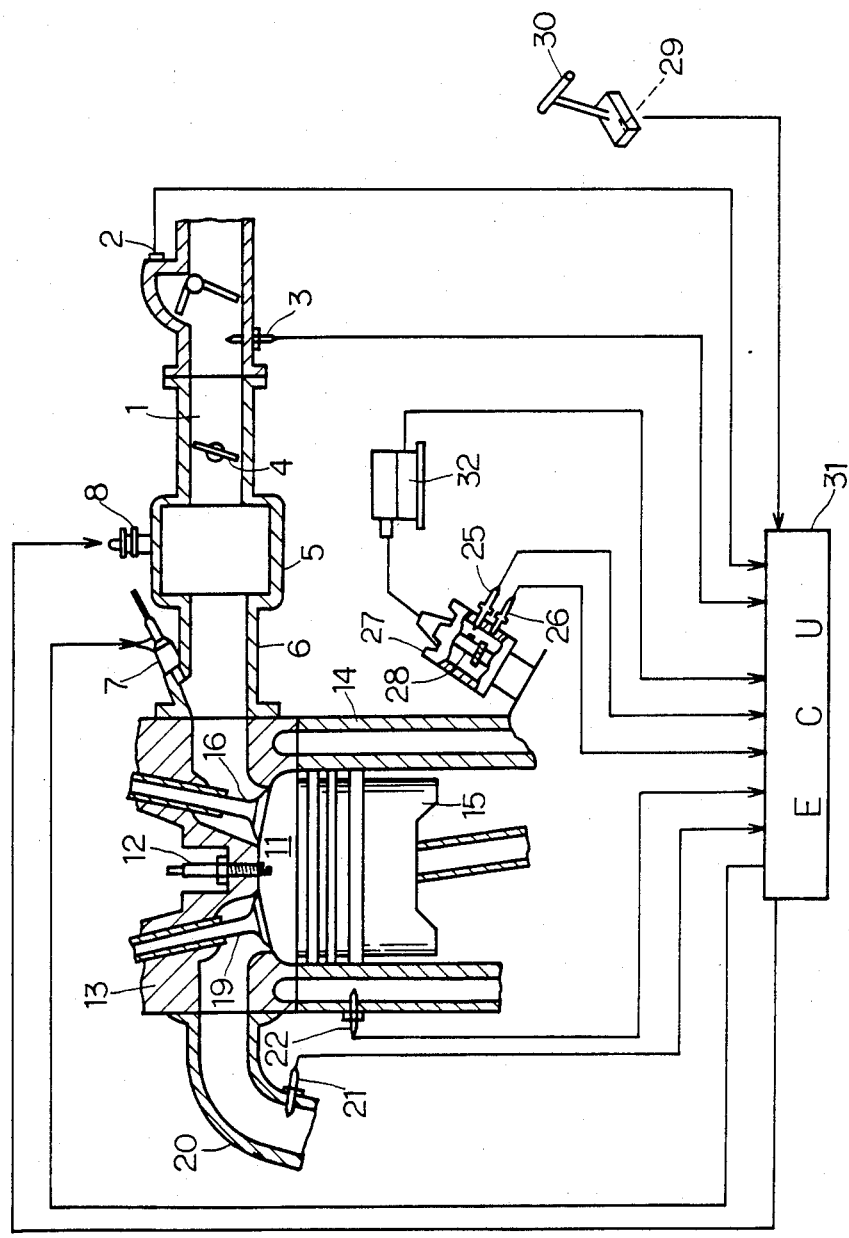
FIG. 1 is a partially schematic view of an internal combustion engine having a fuel injection control device according to the present invention.

Referring first to FIG. 1, there is illustrated a partially schematic view of an internal combustion engine having a fuel injection control device. In the intake passage 1 of the intake pipe 6 there is an air flow meter 2 provided for detecting the amount of the air introduced into the intake passage 1. An intake-air temperature sensor 3 for detecting the temperature of the intake-air and a throttle valve 4 for controlling the amount of the introduced air into the intake passage 1 are also provided in the intake pipe 6. A surge tank 5 is provided in the intake passage 1 for obviating any intake interference which may arise.

A main fuel injection valve 7 is provided on the intake pipe 6 and injects alcohol as the main fuel into the passage of intake pipe 6. A plurality of auxiliary fuel injection valves 8, mounted on the surge tank 5, inject gasoline as an auxiliary fuel into the passage of the intake pipe 6 until the engine temperature reaches a predetermined value. A combustion engine chamber 11, equipped with a spark plug 12 for igniting the air-fuel mixture, is defined by a cylinder head 13, a cylinder block 14 and a piston 15 which reciprocatively moves in the chamber 11.

The combustion engine 11 is connected with the intake passage 1 by an intake valve 16. The air-fuel mixture is supplied into the combustion chamber 11 through the intake valve 16. The exhaust gas combusted in combustion chamber 11 is expelled into an exhaust pipe 20 through an exhaust valve 19. An oxygen sensor 21 is provided to detect the oxygen concentration in the exhaust gas. A water temperature sensor 22, mounted on the cylinder block 14, acts as a means for detecting the temperature of the engine coolant. A cylinder discriminating sensor 25 and an engine speed sensor 26 are provided to detect the crank angle of the engine by monitoring the rotation of a shaft 28 of a distributor 27. The cylinder discriminating sensor 25 issues a pulse every time the shaft 28 rotates 720°. The engine speed (RPM) sensor 26 issues a pulse for each 30° of rotation. A neutral switch 29 is a means for detecting the position of a shift lever in a transmission. The neutral switch 29 is ON when the transmission is not in gear and OFF when the transmission is in forward or reverse gears.

The electronic control unit 31, for controlling the fuel injection system, receives the input signals from the various sensors and issues the output signals to the main fuel injection valve 7 and the igniter 32. The secondary current of igniter 32 is supplied to the ignition plug 12 through the distributor 27.

Figure 2:
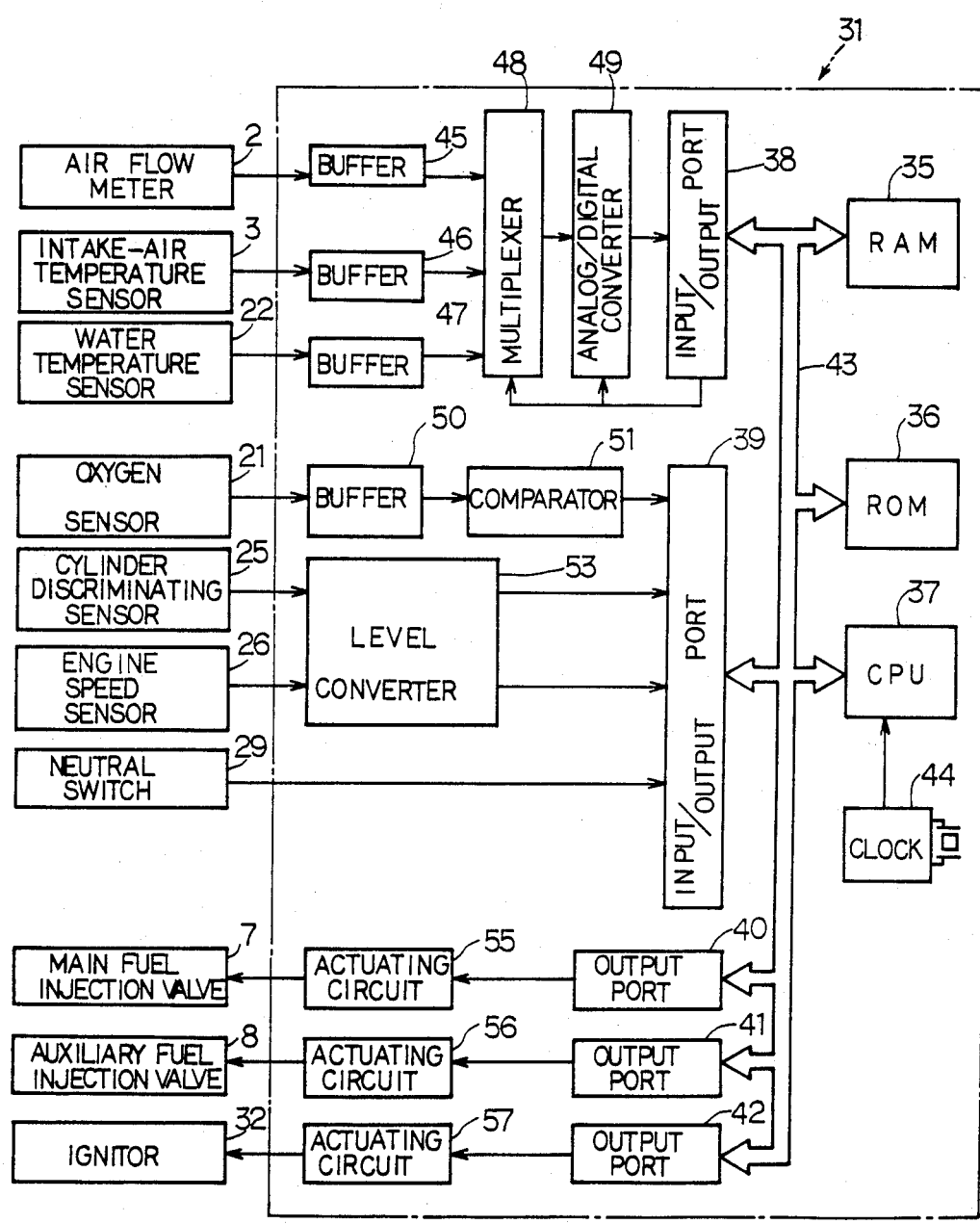
FIG. 2 is a circuit diagram of the electronic control unit illustrated in FIG. 1.

FIG. 2 shows a circuit diagram of the electronic control unit 31. A RAM (Random-Access Memory) 35 temporarily stores the calculated data of the electronic control unit 31. A ROM (Read-Only Memory) 36 stores a predetermined control program and arithmetic constants, input/output ports 38, 39 and output ports 40, 41 and 42, each being connected to the other by utilizing a bus 43. A clock 44 issues a triggering pulse to the CPU. The output signals of the air flow meter 2, the intake-air temperature sensor 3 and the water temperature sensor 22 are fed into an analog multiplexer 48 via the buffer amplifiers 45, 46 and 47, respectively. In the analog multiplexer 48, one output signal is selected from the three aforementioned output signals, and subsequently fed into an analog/digital converter 49. The air flow meter 2 produces an output voltage which is proportional to the amount of air fed into the cylinders. This output voltage of the air flow meter 2 is converted into the corresponding binary code in the analog/digital converter 49, and this binary code is thereby inputted to the CPU 37 via the input/output ports 38 and bus 43.

The intake-air temperature sensor 3 and the water temperature sensor 22 comprise, for example, a thermister element that produces output voltages which are proportional to the temperature of the intake-air fed into the cylinders and the cooling water of the engine, respectively. The output voltages of intake-air temperature sensor 3 and the water temperature sensor 22 are converted into the corresponding binary codes in the analog/digital converter 49, and the binary codes are inputted into the CPU 37 via the input/output ports 38 and bus 43.

The output signal of the oxygen sensor 21 is inputted into a comparator 51 via a buffer amplifier 50 and, in the comparator 51, the output voltage of the oxygen sensor 21 is compared with a reference voltage of approximately 0.4 volts. When the output voltage of the oxygen sensor 21 is lower than the reference voltage, corresponding to a lean fuel mixture, the output voltage produced at one of the output terminals of comparator 51 changes to one resulting in the increase of the amount of the injected fuel. However, when the output voltage of the oxygen sensor 21 is higher than the reference voltage, corresponding to a rich fuel mixture, the output voltage, produced at the other output terminal of the comparator 51 changes to zero resulting in the decrease of the amount of the injected fuel. The output voltage of the comparator 51 is inputted into the CPU 37 via the input/output port 3 and bus 43, resulting in the output signal of the oxygen sensor 21 always being monitored by the CPU 37.

The output signals of the cylinder discriminating sensor 25 and the engine speed (RPM) sensor 26 are inputted into a detecting level converter 53. In the embodiment illustrated in FIG. 1, a group injection system is utilized in which the fuel injection system is divided into two separate systems, and the injection of the fuel in each system occurs independently of the other. The cylinder discriminating sensor 25 produces a pulse signal which is inputted into the level converter 53, which indicates the necessary fuel injection operation. The engine speed sensor 26 produces a pulse each time that the crank shaft rotates a predetermined angle. The pulse of the engine speed sensor 26 is inputted into the detecting level converter 53. The voltage level of the output signals of the cylinder discriminating sensor 25 and the engine speed sensor 26 increases as the rotating speed of the engine increases. However, if the revolution speed of the engine increases, high frequency background noise becomes prevalent in the output signals of the cylinder discriminating sensor 25 and the engine speed sensor 26. Therefore, it becomes necessary to eliminate this high frequency background noise to accurately interpret the output from the cylinder discriminating sensor 25 and the engine speed sensor 26. The detecting level converter 53 is provided to eliminate the high frequency background noise. The detecting level converter 53 eliminates the high frequency noise by increasing the threshold requirements for the data outputted from the aforementioned sensors as the revolution speed of the engine increases. This also results in the accurate monitoring of the two aforementioned sensors by the CPU 37 via the input/output port 39 and the bus 43, even when the engine is operating at low engine speeds.

The outputs 40, 41 and 42 are provided for outputting the necessary data to actuate the main fuel injection valve 7, the auxiliary fuel injection valve 8 and the igniter 32, respectively. The binary coded data received by the output ports 40, 41 and 42 is transmitted from the CPU 37 and carried by the bus 43. The output terminal of the output port 40 is connected to the corresponding input terminal of an actuating circuit 55; the output terminal of the output port 41 is connected to the corresponding input terminal of an actuating circuit 56; and the output terminal of the output port 42 is connected to an actuating circuit 57. The actuating circuits 55, 56 and 57 are provided to convert the binary coded data, sent from the output ports 40, 41 and 42 into a corresponding length of time. The output voltage produced at the output terminals of actuating circuits 55, 56 and 57 is transmitted to the main fuel injection valve 7, the auxiliary fuel injection valve 8 and the igniter 32, respectively. The output voltage from the actuating circuits 55, 56 and 57 controls the duration of operation of the main fuel injection valve 7, the auxiliary fuel injection valve 8 and the igniter 32, respectively.

When the fuel injection valves receive the leading edge of the electrical pulse produced at the output terminals of the actuating circuits 55 and 56 respectively, they begin injecting fuel into the engine. This fuel injection continues for the duration of the electrical pulse. When the igniter 32 receives the leading edge of the electrical pulse produced at the output terminal of the actuating circuit 57, it begins feeding an electric current into the primary coil provided in the igniter, and upon cessation of the actuating output, the secondary coil in the igniter generates a high voltage which is transmitted to the spark plugs 12 via the distributor 27 (FIG. 1).

Figure 3:
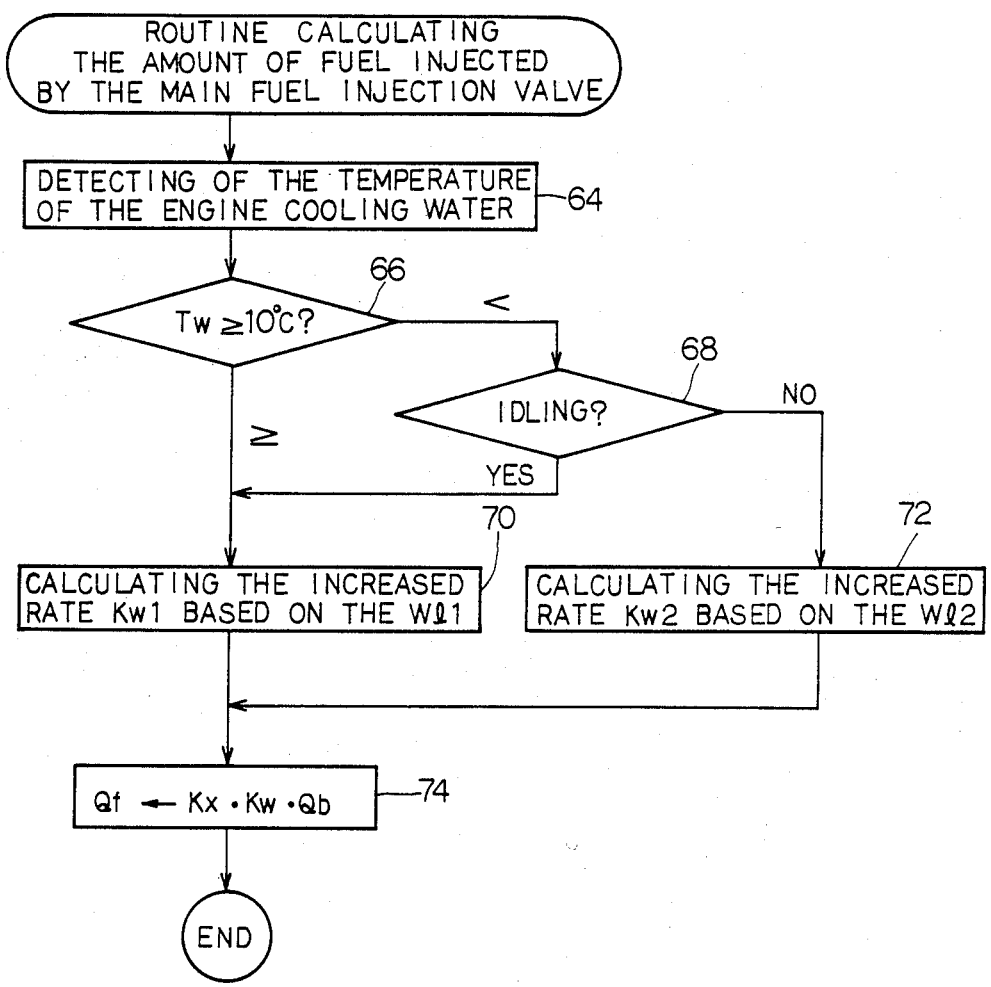
FIG. 3 is a flow chart illustrating the operation of the apparatus according to the present invention.

FIG. 3 illustrates the flow chart of a routine which calculates the amount of fuel to be injected by the main fuel injection valve. The ratio of alcohol fuel to gasoline fuel to be injected varies depending upon whether the engine is idling or not and the temperature of the engine coolant. In step 64, the temperature of the engine cooling water Tw is detected. In step 66, the determination of whether the Tw is greater than, less than or equal to 10° C. is made. If the Tw is greater than or equal to 10° C., the program proceeds to step 70. If the Tw is less than 10° C., the program proceeds to step 68. In step 68 the determination of whether the engine is idling or not is made. This is determined by examining the position of the shift for the transmission. If the shift is not in gear, it is determined that the engine is idling. If the shift is in a driving position, it is determined that the engine is not idling. This examination is performed by the aforementioned neutral switch 29 (FIG. 1). If the engine is idling, the program proceeds to step 70. If the engine is not idling, the program proceeds to step 72. In step 70, the ratio of alcohol to gasoline to be injected is calculated and based upon the characteristic curve Wl1 of FIG. 4. In step 72, the ratio of alcohol to gasoline to be injected is calculated and based upon the characteristic curve Wl2 of FIG. 4. Both curves correspond to engine idling conditions.

The final step 74 of the program calculates the final amount of fuel $Q_f$ to be injected into the engine. $Q_f$ is calculated by the following:

$$Q_f = (Kx)(Kw)(Qb)$$

Where Kx is a compensation coefficient arrived at by the oxygen sensor 21 and the air intake temperature sensor 3, Kw is the ratio of alcohol to gasoline to be injected and Qb is the unadjusted amount of fuel to be injected into the engine based solely upon the air intake rate and the engine speed (RPM).

Figure 4:
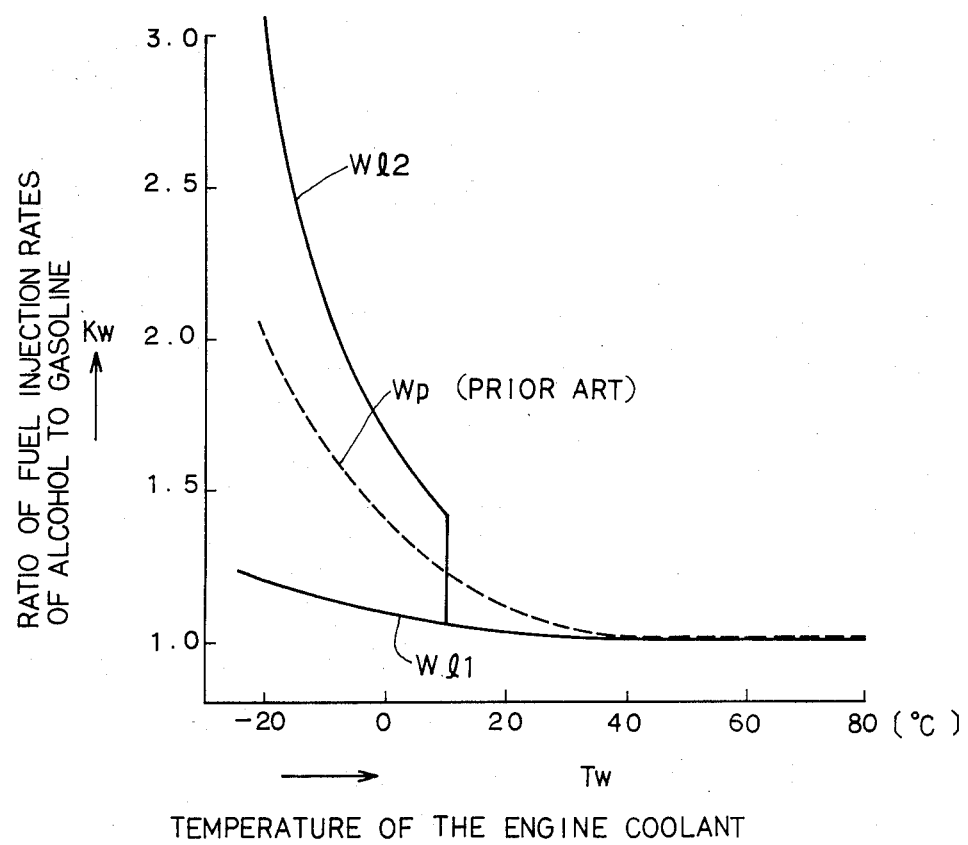
FIG. 4 is a graph illustrating the relationship between an increased ratio of alcohol to gasoline in a mixed fuel system with the engine coolant temperature, when the engine is idling.

In FIG. 4, the characteristic curves Wl1, Wl2 and Wp are illustrated. These curves represent a ratio between the rates of injection of alcohol to gasoline as a function of the temperature of the engine coolant. The curve Wp represents the prior art. The curve Wl1 is defined over the entire temperature range Tw of the engine coolant, and the curve Wl2 is defined for the temperature range of −20° C. to +10° C. By utilizing FIG. 4, the program determines the appropriate value of the compensation coefficient Kx. This value of Kx is then used to calculate the adjusted fuel injection rate $Q_f$ for the appropriate fuel.

The prior art curve Wp yielded higher Kw values at temperatures below approximately 40° C. than the curve Wl1 of the present invention. Therefore, this resulted in more alcohol than necessary being injected into the combustion chamber when the engine was idling. Hence alcohol was wasted the engine would run rough or even stall. The present invention overcomes this prior problem by selecting Kw values from the Wl1 curve when the engine is cool and idling. Additionally, if the engine is cool and not idling, Kw values are selected from the curve Wl2. By selecting the appropriate curves, both the engine performance and the fuel consumption rates are optimized.

Figure 5:
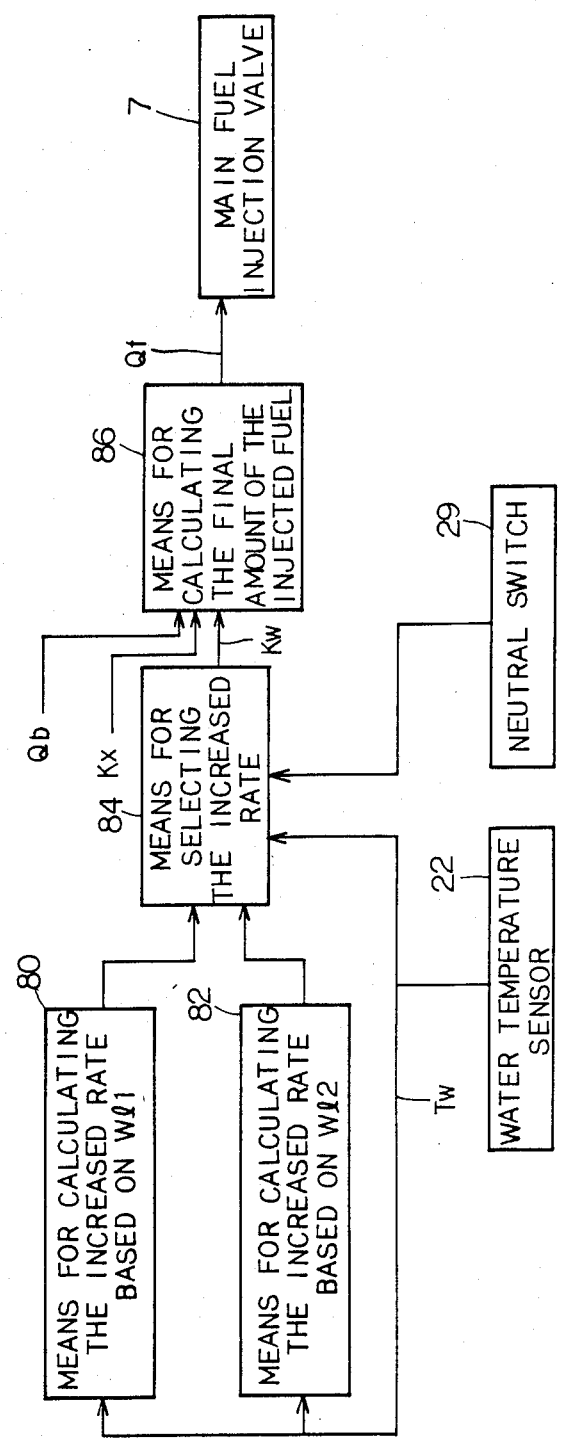
FIG. 5 is a block diagram of the present invention.

FIG. 5 shows a block diagram of the present invention. The means for calculating the rate of alcohol to be injected into the engine is determined by steps 80 and 82. Step 80 utilizes the curve Wl1 of FIG. 4, while step 82 utilizes the curve Wl2 of FIG. 4 for calculating the appropriate injection rates. The curve Wl1 is used if the water temperature sensor 22 determines that the engine coolant is less than 10° C. and the transmission is in neutral, park/stop, as determined by the neutral switch 20. The curve Wl1 will also be used if the temperature of the engine coolant is greater than or equal to 10° C. regardless of whether the engine is idling or not. However, the curve Wl2 is used if the temperature of the engine coolant is greater than or equal to 10° C. and the engine is not idling, as determined by the aforementioned devices.

The outputs of these respective devices are sent to a calculating means 86 which calculates the final amount of alcohol fuel to be injected into the engine by the main fuel injection valve by utilizing the aforementioned equation:

$$Q_f = (Kx)(Kw)(Qb).$$

While the present invention has been described in its preferred embodiments, it is to be understood that the invention is not limited thereto, and may be otherwise embodied within the scope of the following claims.

What is claimed is:

1. An apparatus for controlling the amount of alcohol and gasoline supplied to a combustion chamber of a mixed fuel engine, comprising:
    a main fuel injection valve for injecting alcohol fuel to be supplied to the combustion chamber of an engine;
    an auxiliary fuel injection valve for injecting gasoline fuel to be supplied to the combustion chamber of an engine;
    a first detecting means for detecting temperature of a coolant in the engine;
    a second detecting means for detecting whether the engine is idling;
    a memory means for storing:
        (1) a prescribed fuel rate ratio of alcohol to gasoline, which is to be injected into the engine upon determining by the first detecting means that the engine coolant temperature is less than or equal to a predetermined temperature and the second detecting means determines that the engine is not idling;
        (2) a basic fuel rate ratio of alcohol to gasoline, which is to be injected into the engine upon determining by the first detecting means that the engine coolant temperature is greater than the predetermined temperature;
        (3) a compensated fuel rate ratio of alcohol to gasoline, which is to be injected into the engine upon determining by the first detecting means is less that a predetermined temperature and the second detecting means determining that the engine is idling;
    a central processing unit connected for accepting data from the detecting means and the memory means, and therefrom calculating and transmitting injection signals to the main and auxiliary fuel injection valves for injecting calculated amounts of fuel dependent upon the detected parameters and the fuel rate ratios stored in the memory means; and
    an actuating means for operating the main and auxiliary fuel injection valves in accordance with the signals from the central processing unit, whereby starting of the engine is improved by increasing the ratio of gasoline is alcohol in the combustion chamber.

2. The apparatus of claim 1, wherein the second detecting means comprises a neutral switch provided on a gear shift lever of a transmission.

3. The apparatus of claim 2, wherein the neutral switch is OFF whenever the transmission is engaged in either forward or reverse gears.

4. The apparatus of claim 1, wherein the first detecting means comprises a temperature sensor that produces output voltages which vary according to the detected temperature.

5. The apparatus of claim 4, wherein the engine is determined to be warming up if the temperature of the coolant of the engine is not in excess of 10° C.

6. The apparatus of claim 1, further comprising a third detecting means for determining oxygen content of the exhaust gases from the combustion chamber.

7. The apparatus of claim 6, wherein the third detecting means comprises an oxygen sensor that produces output voltages which vary according to the oxygen content of the exhaust gases.

8. The apparatus of claim 7, wherein the output voltage is compared to a predetermined voltage to determine whether the fuel mixture is rich or lean.

9. The apparatus of claim 8, wherein if the fuel mixture is determined to be lean, an increased amount of fuel is injected and conversely, if the fuel mixture is determined to be rich, a decreased amount of fuel is injected.

10. The apparatus of claim 1, wherein the prescribed fuel rate ratio of alcohol to gasoline decreases as the temperature of the engine coolant increases.

11. The apparatus of claim 1, wherein the basic fuel rate ratio of alcohol to gasoline decreases as the temperature of the engine coolant increases.

12. The apparatus of claim 1, wherein the compensated fuel rate ratio of alcohol to gasoline decreases as the temperature of the engine coolant increases.

13. A process for determining an amount of alcohol and gasoline fuel to be injected into a combustion chamber of a mixed fuel engine, comprising:
  detecting temperature of coolant in the engine;
  detecting whether the engine is idling;
  storing a prescribed fuel rate ratio of alcohol to gasoline, which is to be injected into the engine;
  storing a basic fuel rate ratio of alcohol to gasoline, which is to be injected into the engine;
  storing a compensated fuel rate ratio of alcohol to gasoline, which is to be injected into the engine
  comparing the detected value of engine coolant temperature and idling condition, with the stored fuel rate ratios and generating a comparator output signal indicative of the result of the comparison;
  using the output of the comparator to activate an alcohol fuel injection valve to inject alcohol which is to be injection into the combustion chamber of the engine; and
  using the output of the comparator to actuate a gasoline fuel injection valve to inject gasoline which is to be injected into the combustion chamber of the engine.

14. The process of claim 13, wherein the engine is determined to be idling by examining the position of a gear shift lever of a transmission.

15. The process of claim 14, wherein the engine is determined to be idling if the gear shift lever is not engaged in a forward or reverse gear.

16. The process of claim 13, wherein the presecibed fuel rate ratio of alcohol to gasoline is selected when the temperature of the engine coolant is less than or equal to a predetermined temperature and the engine is not idling.

17. The process of claim 13, wherein the basic fuel rate ratio of alcohol to gasoline is selected when the temperature of the engine coolant is greater than the predetermined temperature.

18. The process of claim 13, wherein the compensated fuel ratio ratio of alcohol to gasoline is selected when the temperature of the engine coolant is less than the predetermined temperature and the engine is idling.

19. The process of claim 13, wherein the engine is determined to be warming up if the temperature of the coolant is not in excess of 10° C.

20. The process of claim 13, further comprising detecting oxygen content of exhaust gases from the combustion chamber of the engine.

21. The process of claim 13, wherein the oxygen content of the exhaust gases is determined by an oxygen sensor.

22. The process of claim 13, wherein the oxygen sensor produces an output voltage that is compared to a predetermined voltage.

23. The process of claim 13, wherein alcohol is injected by a main fuel injection valve.

24. The process of claim 13, wherein gasoline is injected by an auxiliary fuel injection valve.

25. The process of claim 9, wherein the prescribed fuel rate ratio of alcohol to gasoline decreases as the temperature of the engine coolant increases.

26. The process of claim 9, wherein the basic fuel rate ratio of alcohol to gasoline decreases as the temperature of the engine coolant increases.

27. The process of claim 9, wherein the compensated fuel rate ratio of alcohol to gasoline decreases as the temperature of the engine coolant increases.

28. A process for determining an amount of alcohol and gasoline fuel to be injected into a combustion chamber of a mixed fuel engine, comprising:
  detecting temperature of coolant in the engine;
  detecting whether the engine is idling;
  storing a prescribed fuel rate ratio of alcohol to gasoline, which is to be injected into the engine upon determining that the engine coolant temperature is less than or equal to a predetermined temperature and the engine is not idling;
  storing a basic fuel rate ratio of alcohol to gasoline, which is to be injected into the engine upon determining that the engine coolant temperature is greater than the predetermined temperature;
  storing a compensated fuel rate ratio of alcohol to gasoline, which is to be injected into the engine upon determining that the engine coolant temperature is less than a predetermined temperature and the engine is idling;
  comparing the detected value of engine coolant temperature and idling condition with the stored fuel rate ratios and generating a comparator output signal indicative of the result of the comparison;
  using the output of the comparator to activate an alcohol fuel injection valve to inject alcohol which is to be injected into the combustion chamber of the engine; and
  using the output of the comparator to actuate a gasoline fuel injection valve to inject gasoline which is to be injected into the combustion chamber of the engine.

29. The process of claim 28, further comprising detecting oxygen content of the exhaust gases from the combustion chamber.

* * * * *